United States Patent
Yokoo et al.

(10) Patent No.: US 10,725,367 B2
(45) Date of Patent: Jul. 28, 2020

(54) WAVELENGTH CONVERSION ELEMENT, METHOD OF MANUFACTURING WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Tomohiro Yokoo, Matsumoto (JP); Kei Tadachi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/357,668

(22) Filed: Mar. 19, 2019

(65) Prior Publication Data

US 2019/0294033 A1   Sep. 26, 2019

(30) Foreign Application Priority Data

Mar. 20, 2018  (JP) ................. 2018-052135

(51) Int. Cl.
  *G03B 21/20*  (2006.01)
  *G03B 21/16*  (2006.01)
  *G03B 21/00*  (2006.01)

(52) U.S. Cl.
  CPC ......... *G03B 21/204* (2013.01); *G03B 21/006* (2013.01); *G03B 21/16* (2013.01); *G03B 21/2066* (2013.01)

(58) Field of Classification Search
  CPC .. G03B 21/145; G03B 21/204; G03B 21/208; G03B 21/2013; G03B 21/2033; G03B 21/2053; G03B 21/2066
  See application file for complete search history.

(56) References Cited

U.S. PATENT DOCUMENTS

| 2010/0123386 | A1* | 5/2010 | Chen | H01L 33/58 313/502 |
| 2014/0168942 | A1* | 6/2014 | Kishimoto | F21S 43/13 362/84 |
| 2015/0346594 | A1* | 12/2015 | Shimizu | G03B 21/204 353/31 |
| 2016/0266375 | A1* | 9/2016 | Li | H05B 33/10 |
| 2018/0088453 | A1* | 3/2018 | Yasumatsu | G02B 27/141 |
| 2019/0294032 | A1* | 9/2019 | Hirano | F21V 9/30 |

FOREIGN PATENT DOCUMENTS

| JP | 2015-119046 A | 6/2015 |
| WO | 2015/194455 A1 | 12/2015 |

* cited by examiner

*Primary Examiner* — Sultan Chowdhury
(74) *Attorney, Agent, or Firm* — Oliff PLC

(57) ABSTRACT

A wavelength conversion element according to the invention includes a wavelength conversion layer having a plurality of air holes, and excited by light in a first wavelength band to thereby generate light in a second wavelength band different from the first wavelength band, a transparent member adapted to seal a recessed section occurring on a first surface of the wavelength conversion layer due to the air hole, a reflecting layer disposed so as to be opposed to the first surface of the wavelength conversion layer, and a base member disposed so as to be opposed to the reflecting layer, and the transparent member is disposed in some of the plurality of air holes.

17 Claims, 5 Drawing Sheets

WAVELENGTH CONVERSION ELEMENT, METHOD OF MANUFACTURING WAVELENGTH CONVERSION ELEMENT, LIGHT SOURCE DEVICE, AND PROJECTOR

BACKGROUND

1. Technical Field

The present invention relates to a wavelength conversion element, a method of manufacturing a wavelength conversion element, a light source device and a projector.

2. Related Art

In recent years, some of illumination devices used for projectors use fluorescence as the illumination light. For example, in JP-A-2015-119046, there is disclosed a light emitting device provided with a light source for emitting a laser beam, and a fluorescence emitting section for emitting fluorescence in response to incidence of the laser beam. In this light emitting device, the fluorescence emitting section is provided with a phosphor layer, a substrate for supporting the phosphor layer, and a reflecting layer disposed between the substrate and the phosphor layer. Further, the fluorescence emitting section reflects the fluorescence generated in the phosphor layer with the reflecting layer to thereby take out the fluorescence as illumination light.

As such a reflecting layer as described above, those superior in durability are desirable. For example, in International Publication No. WO 2015/194455, there is disclosed usage of an Ag film as a reflecting layer having resistance to heat and light.

Therefore, it is also conceivable to use Ag as a reflecting layer for reflecting the fluorescence generated in the phosphor layer. However, in the case of using Ag as the reflecting layer, due to occurrence of thermal migration, the reflectance of the reflecting layer deteriorates due to the aggregation of the Ag atoms, and thus an amount of the fluorescence emitted from the phosphor decreases.

In contrast, it is conceivable to form air holes inside the phosphor layer to diffuse the fluorescence to thereby improve the extraction efficiency of the fluorescence. However, in the case of forming the air holes in the phosphor layer, since the recessed sections occur on the surface of the phosphor layer, there is a possibility that the reflecting layer formed on the phosphor layer becomes lower in evenness, and at the same time, there is a possibility that defects occur in the film. Since the defective part of the reflecting layer can be an aggregation pathway of the Ag atoms described above, there is a possibility that the deterioration of the reflectance due to the aggregation is promoted to decrease the amount of the fluorescence emitted from the phosphor layer.

SUMMARY

An advantage of some aspects of the invention is to provide a wavelength conversion element and a method of manufacturing a wavelength conversion element capable of reducing the decrease in an emission amount of the fluorescence to thereby solve the problem described above. Another advantage of some aspects of the invention is to provide a light source device equipped with the wavelength conversion element described above. Still another advantage of the invention is to provide a projector equipped with the light source device described above.

According to a first aspect of the invention, there is provided a wavelength conversion element including a wavelength conversion layer having a plurality of air holes, and excited by light in a first wavelength band to thereby generate light in a second wavelength band different from the first wavelength band, a transparent member adapted to seal a recessed section occurring on a first surface of the wavelength conversion layer due to the air hole, a reflecting layer disposed so as to be opposed to the first surface of the wavelength conversion layer, and a base member disposed so as to be opposed to the reflecting layer, wherein the transparent member is disposed in some of the plurality of air holes.

In the first aspect of the invention described above, it is preferable that the transparent member is also disposed on at least a part of a side surface in the wavelength conversion layer.

In the first aspect of the invention described above, it is preferable that there is further included a first layer disposed between the wavelength conversion layer and the reflecting layer, and the transparent member is disposed on an opposite side to the first layer with respect to the reflecting layer.

Further, it is more desirable for the transparent member to be disposed on a side surface of the first layer.

According to a second aspect of the invention, there is provided a light source device including the wavelength conversion element according to the first aspect of the invention, and a light source adapted to emit the excitation light.

According to a third aspect of the invention, there is provided a projector including the light source device according to the second aspect of the invention, a light modulation device adapted to modulate light from the light source device in accordance with image information to thereby form image light, and a projection optical system adapted to project the image light.

According to a fourth aspect of the invention, there is provided a method of manufacturing a wavelength conversion element including the steps of forming a wavelength conversion layer having a plurality of air holes, forming a transparent member adapted to seal a recessed section generated due to the air hole by dipping at least a first surface having the recessed section out of the wavelength conversion layer in a predetermined solution, and then calcining the predetermined solution, and forming a reflecting layer at a position opposed to the first surface of the wavelength conversion layer.

In the fourth aspect of the invention described above, it is preferable that in the step of forming the transparent member, at least a part of a side surface crossing the first surface in the wavelength conversion layer is dipped in the solution.

According to a fifth aspect of the invention, there is provided a method of manufacturing a wavelength conversion element including the steps of forming a wavelength conversion layer having a plurality of air holes and a recessed section generated due to the air hole, forming a first layer at a position opposed to a first surface of the wavelength conversion layer, forming a reflecting layer on an opposite side to the wavelength conversion layer of the first layer, and forming a transparent member adapted to seal the recessed section by dipping the first layer and the reflecting layer in a predetermined solution after the step of forming the reflecting layer, and then calcining the predetermined solution.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will hereinafter be described in detail with reference to the drawings.

It should be noted that the drawings used in the following description show characteristic parts in an enlarged manner in some cases for the sake of convenience in order to make the features easy to understand, and the dimensional ratios between the constituents and so on are not necessarily the same as actual ones.

First Embodiment

Firstly, an example of a projector according to the present embodiment will be described.

Figure 1:
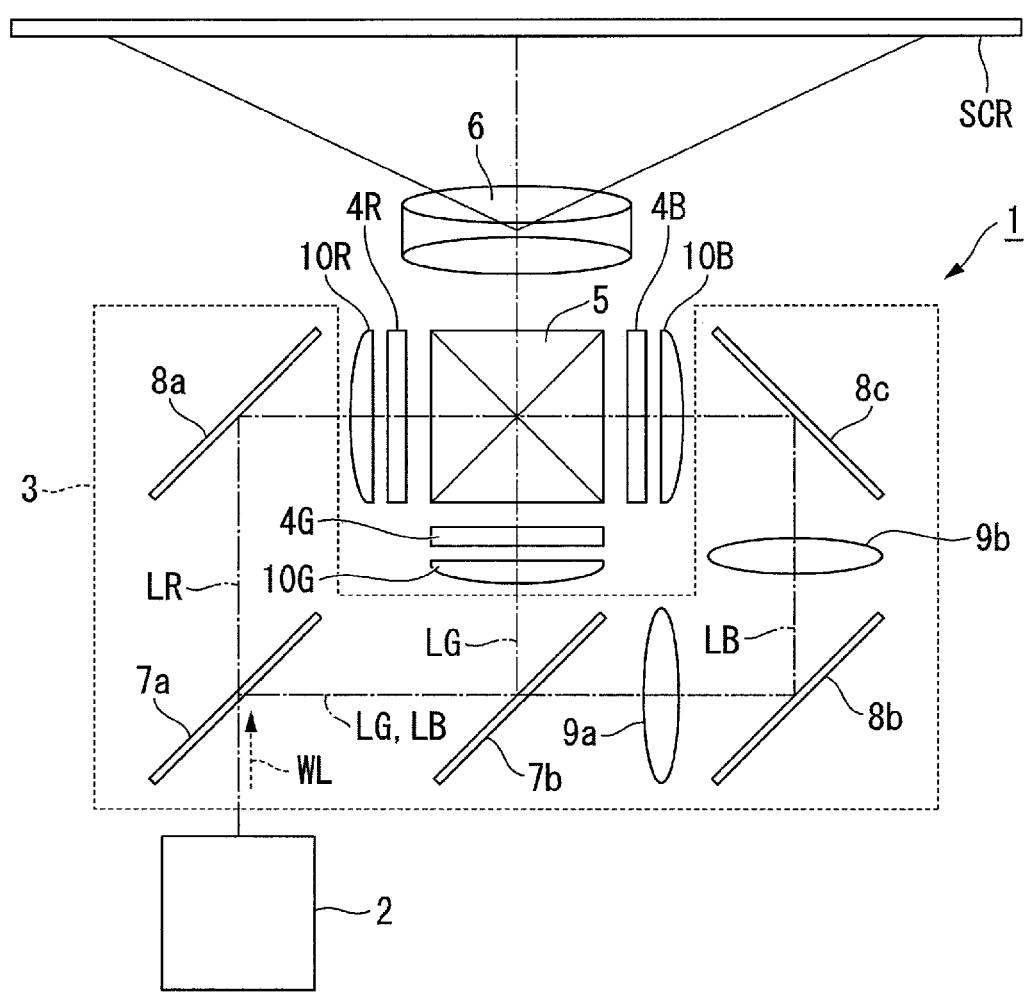
FIG. 1 is a diagram showing a schematic configuration of a projector according to a first embodiment of the invention.

FIG. 1 is a diagram showing a schematic configuration of the projector according to the present embodiment.

As shown in FIG. 1, a projector 1 according to the present embodiment is a projection-type image display device for displaying a color picture on a screen SCR. The projector 1 is provided with an illumination device 2, a color separation optical system 3, a light modulation device 4R, a light modulation device 4G, a light modulation device 4B, a combining optical system 5, and a projection optical system 6.

The color separation optical system 3 separates illumination light WL into red light LR, green light LG, and blue light LB. The color separation optical system 3 is generally provided with a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the illumination device 2 into the red light LR and the other light (the green light LG and the blue light LB). The first dichroic mirror 7a transmits the red light LR thus separated from, and at the same time reflects the rest of the light (the green light LG and the blue light LB). In contrast, the second dichroic mirror 7b reflects the green light LG and at the same time transmits the blue light LB to thereby separate the rest of the light into the green light LG and the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected from the second dichroic mirror 7b toward the light modulation device 4G.

The first relay lens 9a and the second relay lens 9b are disposed in the posterior stage of the second dichroic mirror 7b in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incident side and the exit side of each of the liquid crystal panels, there are respectively disposed polarization plates (not shown).

Further, on the incident side of the light modulation device 4R, the light modulation device 4G, and the light modulation device 4B, there are respectively disposed a field lens 10R, a field lens 10G and a field lens 10B. The field lens 10R, the field lens 10G and the field lens 10B collimate the red light LR, the green light LG and the blue light LB entering the light modulation device 4R, the light modulation device 4G and the light modulation device 4B, respectively.

The image light from the light modulation device 4R, the light modulation device 4G, and the light modulation device 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is constituted by a projection lens group, and projects the image light combined by the combining optical system 5 toward the screen SCR in an enlarged manner. Thus, the color picture enlarged is displayed on the screen SCR.

Illumination Device

Figure 2:
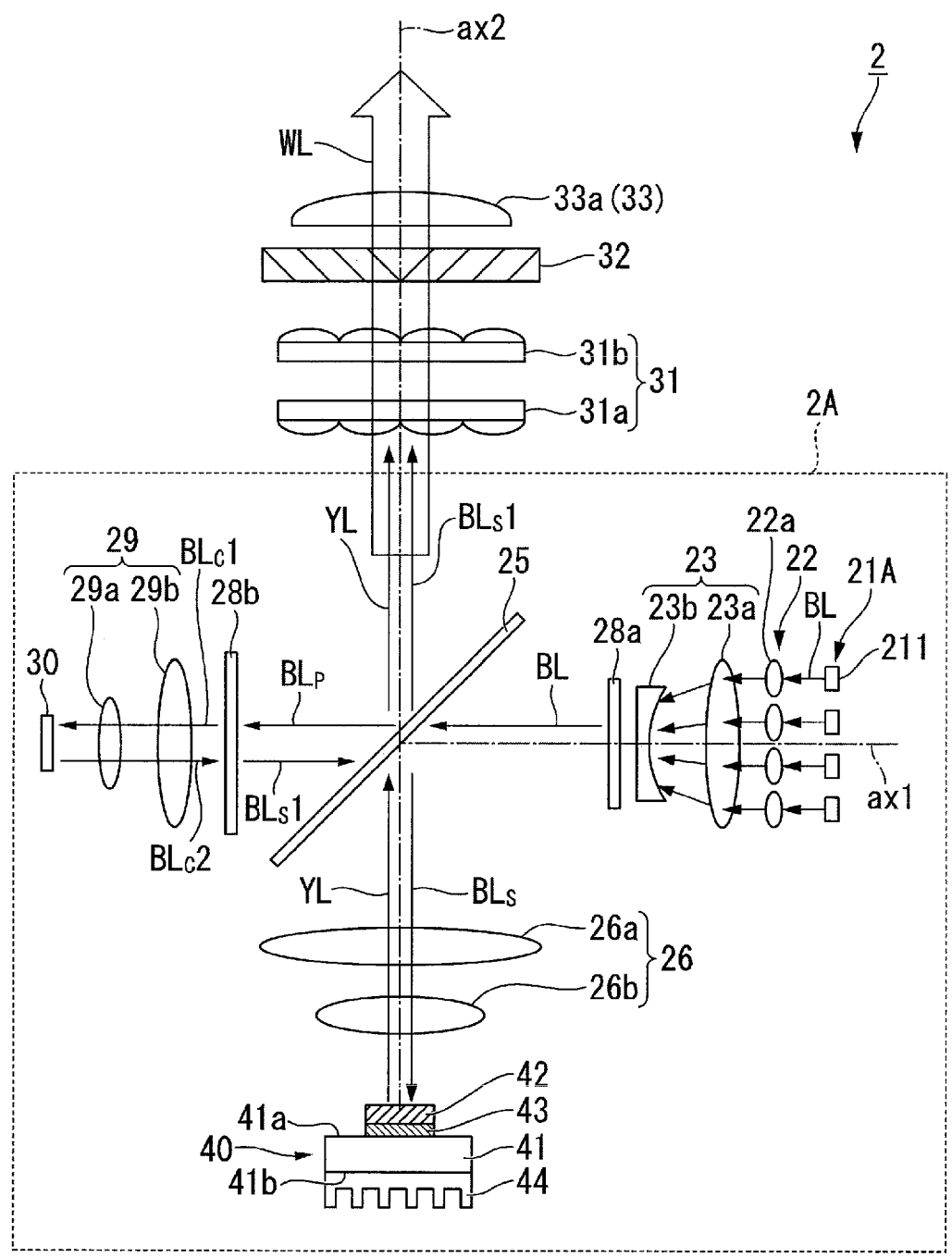
FIG. 2 is a diagram showing a schematic configuration of an illumination device.

Then, the illumination device 2 according to the present embodiment will be described. FIG. 2 is a diagram showing a schematic configuration of the illumination device 2. As shown in FIG. 2, the illumination device 2 is provided with a light source device 2A, an integrator optical system 31, a polarization conversion element 32, and a superimposing lens 33a. In the present embodiment, the integrator optical system 31 and the superimposing lens 33a form a superimposing optical system 33.

The light source device 2A is provided with an array light source 21A, a collimator optical system 22, an afocal optical system 23, a first wave plate 28a, a polarization separation element 25, a first light collection optical system 26, a wavelength conversion element 40, a second wave plate 28b, a second light collection optical system 29, and a diffusely reflecting element 30.

The array light source 21A, the collimator optical system 22, the afocal optical system 23, the first wave plate 28a, the polarization separation element 25, the second wave plate 28b, the second light collection optical system 29 and the diffusely reflecting element 30 are arranged in series on a light axis ax1. In contrast, the wavelength conversion element 40, the first light collection optical system 26, the polarization separation element 25, the integrator optical system 31, the polarization conversion element 32 and the superimposing lens 33a are arranged in series on an illumination light axis ax2. The light axis ax1 and the illumination light axis ax2 are located in the same plane, and are perpendicular to each other.

The array light source 21A is provided with a plurality of semiconductor lasers 211 as solid-state light sources. The plurality of semiconductor lasers 211 is arranged in an array in a plane perpendicular to the light axis ax1. The semiconductor lasers 211 each emit, for example, a blue light beam BL (e.g., a laser beam with a peak wavelength of 460 nm). The array light source 21A emits the pencil consisting of a plurality of light beams BL. In the present embodiment, the array light source 21A corresponds to a "light source" in the appended claims.

The light beams BL emitted from the array light source 21A enter the collimator optical system 22. The collimator optical system 22 converts the light beams BL emitted from the array light source 21A into parallel light. The collimator optical system 22 is constituted by, for example, a plurality of collimator lenses 22a arranged side by side in an array. The collimator lenses 22a are disposed so as to correspond respectively to the semiconductor lasers 211.

The light beams BL having passed through the collimator optical system 22 enter the afocal optical system 23. The afocal optical system 23 adjusts the beam diameter of the light beams BL. The afocal optical system 23 is constituted by, for example, a convex lens 23a and a concave lens 23b.

The light beams BL having passed through the afocal optical system 23 enter the first wave plate 28a. The first wave plate 28a is, for example, a half-wave plate arranged to be able to rotate. The light beams BL emitted from the semiconductor lasers 211 are each linearly polarized light. By appropriately setting the rotational angle of the first wave plate 28a, light beams including an S-polarization component and a P-polarization component with respect to the polarization separation element 25 at a predetermined ratio can be obtained as the light beams BL transmitted through the first wave plate 28a. By rotating the first wave plate 28a, it is possible to change the ratio between the S-polarization component and the P-polarization component.

The light beams BL, which are generated by passing through the first wave plate 28a, and include the S-polarization component and the P-polarization component, enter the polarization separation element 25. The polarization separation element 25 is formed of, for example, a polarization beam splitter having wavelength selectivity. The polarization separation element 25 also forms an angle of 45° with the light axis ax1 and the illumination light axis ax2.

The polarization separation element 25 has a polarization separation function of separating each of the light beams BL into a light beam BLs as the S-polarization component with respect to the polarization separation element 25 and a light beam BLp as the P-polarization component. Specifically, the polarization separation element 25 reflects the light beam BLs as the S-polarization component, and transmits the light beam BLp as the P-polarization component.

Further, the polarization separation element 25 has a color separation function of transmitting fluorescence YL different in wavelength band from the light beams BL irrespective of the polarization state of the fluorescence YL.

The light beam BLs as the S-polarization component having been reflected from the polarization separation element 25 enters the first light collection optical system 26. The first light collection optical system 26 converges the light beam BLs toward the wavelength conversion element 40.

In the present embodiment, the first light collection optical system 26 is constituted by, for example, a first lens 26a and a second lens 26b. The light beam BLs having passed through the first light collection optical system 26 enters the wavelength conversion element 40 in a converged state.

The fluorescence YL having been generated in the wavelength conversion element 40 is collimated by the first light collection optical system 26, and then enters the polarization separation element 25. The fluorescence YL is transmitted through the polarization separation element 25.

Meanwhile, the light beam BLp as the P-polarization component having passed through the polarization separation element 25 enters the second wave plate 28b. The second wave plate 28b is formed of a quarter-wave plate disposed in the light path between the polarization separation element 25 and the diffusely reflecting element 30. Therefore, the light beam BLp as the P-polarization component having passed through the polarization separation element 25 is converted by the second wave plate 28b into, for example, blue light BLc1 as clockwise circularly polarized light, and then enters the second light collection optical system 29.

The second light collection optical system 29 is constituted by, for example, convex lenses 29a, 29b, and makes the blue light BLc1 enter the diffusely reflecting element 30 in a converged state.

The diffusely reflecting element 30 is disposed on the opposite side to a phosphor layer 42 with respect to the polarization separation element 25, and diffusely reflects the blue light BLc1, which has passed through the second light collection optical system 29, toward the polarization separation element 25. As the diffusely reflecting element 30, it is preferable to use an element which causes the Lambertian reflection of the blue light BLc1, and at the same time does not disturb the polarization state.

Hereinafter, the light diffusely reflected by the diffusely reflecting element 30 is referred to as blue light BLc2. According to the present embodiment, by diffusely reflecting the blue light BLc1, there can be obtained the blue light BLc2 having a roughly homogenous illuminance distribution. For example, the blue light BLc1 as the clockwise circularly polarized light is reflected as the blue light BLc2 as counterclockwise circularly polarized light.

The blue light BLc2 is converted by the second light collection optical system 29 into parallel light, and then enters the second wave plate 28b once again.

The blue light BLc2 as the counterclockwise circularly polarized light is converted by the second wave plate 28b into blue light BLs1 as S-polarization component. The blue light BLs1 as the S-polarization component is reflected by the polarization separation element 25 toward the integrator optical system 31.

Thus, the blue light BLs1 is used as the illumination light WL together with the fluorescence YL having been transmitted through the polarization separation element 25. Specifically, the blue light BLs1 and the fluorescence YL are emitted from the polarization separation element 25 toward the respective directions the same as each other, and thus, there is formed the white illumination light WL having the blue light BLs1 and the fluorescence (the yellow light) YL mixed with each other.

The illumination light WL is emitted toward the integrator optical system 31. The integrator optical system 31 is constituted by, for example, a lens array 31a, and a lens array 31b. The lens arrays 31a, 31b are each formed of what has a plurality of small lenses arranged in an array.

The illumination light WL having been transmitted through the integrator optical system 31 enters the polarization conversion element 32. The polarization conversion element 32 is constituted by a polarization separation film and a wave plate. The polarization conversion element 32 converts the illumination light WL including the fluorescence YL as the non-polarized light into linearly polarized light.

The illumination light WL having been transmitted through the polarization conversion element 32 enters the superimposing lens 33a. The superimposing lens 33a homogenizes the distribution of the illuminance due to the illumination light WL in the illumination target area in cooperation with the integrator optical system 31. The illumination device 2 generates the illumination light WL in such a manner as described above.

Wavelength Conversion Element

As shown in FIG. 2, the wavelength conversion element 40 is provided with a base member 41 and the phosphor layer 42, and has a stationary configuration which does not rotate. The base member 41 has a first surface 41a located on the first light collection optical system 26 side, and a second surface 41b located on the opposite side to the first surface 41a. The wavelength conversion element 40 is further provided with a reflecting member 43 and a heat radiation member 44, wherein the reflecting member 43 is disposed between the first surface 41a and the phosphor layer 42, and the heat radiation member 44 is disposed on the second surface 41b. In the present embodiment, the phosphor layer 42 corresponds to a "wavelength conversion layer" described in the appended claims.

As a material of the base member 41, a material high in thermal conductivity and superior in heat radiation performance is preferably used, and there can be cited, for example, metal such as aluminum or copper, and ceramics such as aluminum nitride, alumina, sapphire, or diamond. In the present embodiment, the base member 41 is formed using copper.

In the present embodiment, the phosphor layer 42 is held on the first surface 41a of the base member 41 via a bonding material described later. The phosphor layer 42 converts a part of the incident light into the fluorescence YL to emit the fluorescence YL. Further, the light having entered the reflecting member 43 from the phosphor layer 42 is reflected by the reflecting member 43 toward the first light collection optical system 26.

The heat radiation member 44 is formed of, for example, a structure constituted by a heatsink, and having a plurality of fins. The heat radiation member 44 is disposed on the second surface 41b on the opposite side to the phosphor layer 42 in the base member 41. It should be noted that the heat radiation member 44 is fixed to the base member 41 with, for example, bonding (metal bonding) using metal brazing. In the wavelength conversion element 40, since heat can be radiated via the heat radiation member 44, it is possible to prevent the heat deterioration of the phosphor layer 42.

Figure 3:
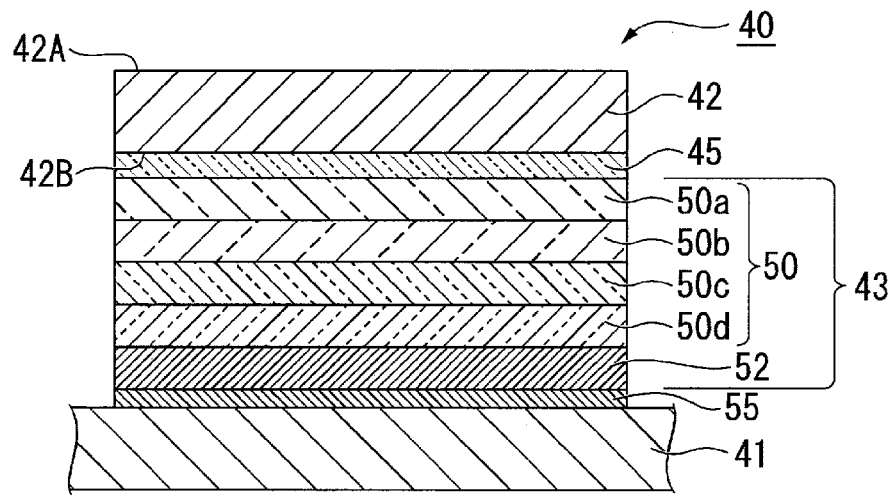
FIG. 3 is a cross-sectional view showing a configuration of an essential part of a wavelength conversion element.

In the present embodiment, the reflecting member 43 is formed of a multilayer film having a plurality of films stacked on one another. FIG. 3 is a cross-sectional view showing a configuration of an essential part of the wavelength conversion element 40. Specifically, FIG. 3 is a diagram showing a cross-section of the reflecting member 43. It should be noted that in FIG. 3, illustration of the heat radiation member 44 is omitted. Hereinafter, the light beam BLs emitted from the first light collection optical system 26 and entering the phosphor layer 42 is referred to as excitation light BLs.

As shown in FIG. 3, the phosphor layer 42 is provided with a plane of incidence of light 42A which the excitation light BLs enters, and from which the fluorescence YL is emitted, and a surface opposed to the plane of incidence of light 42A, namely a bottom surface 42B on which the reflecting member 43 is disposed. In the present embodiment, the bottom surface 42B corresponds to a "first surface" described in the appended claims.

In the present embodiment, the phosphor layer 42 is a ceramic phosphor formed by calcining phosphor particles. As the phosphor particles constituting the phosphor layer 42, there is used a YAG (yttrium aluminum garnet) phosphor including Ce ions.

It should be noted that the constituent material of the phosphor particles can be unique, or it is also possible to use a mixture of the particles formed using two or more types of materials. As the phosphor layer 42, there is preferably used a phosphor layer having the phosphor particles dispersed in an inorganic binder such as alumina, a phosphor layer formed by calcining a glass binder as an inorganic material and the phosphor particles, or the like. Further, it is also possible to form the phosphor layer by calcining the phosphor particles without using a binder.

The reflecting member 43 is disposed on the bottom surface 42B side of the phosphor layer 42. The phosphor layer 42 provided with the reflecting member 43 is bonded to the base member 41 via a bonding material 55. As the bonding material 55, there is used, for example, nano-silver paste. It should be noted that as the bonding material 55, it is also possible to use, for example, metal bonding using metal brazing.

The reflecting member 43 of the present embodiment is configured by stacking a multilayer film 50 and a reflecting layer 52 in series from the bottom surface 42B side of the phosphor layer 42. The details of the reflecting member 43 will be described later.

A transparent member 45 is disposed between the bottom surface 42B of the phosphor layer 42 and the multilayer film 50 (a total reflection layer 50a to be described later). The details of the transparent member 45 will be described later.

Figure 4:
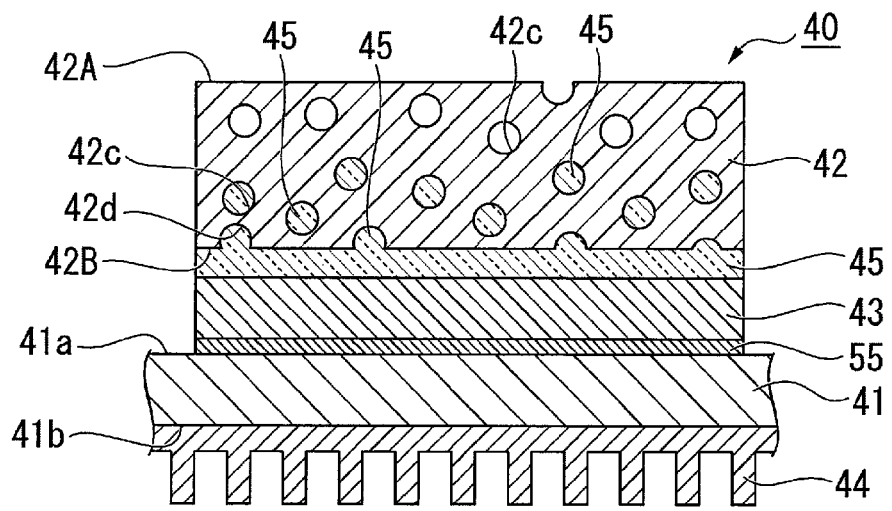
FIG. 4 is a cross-sectional view showing a configuration of an essential part of a phosphor layer.

FIG. 4 is a cross-sectional view showing a configuration of an essential part of the phosphor layer 42.

As shown in FIG. 4, in the present embodiment, the phosphor layer 42 has a plurality of air holes 42c disposed inside. Thus, the phosphor layer 42 has a light scattering property due to the plurality of air holes 42c.

Since some of the plurality of air holes 42c are formed on the surface (the bottom surface 42B) of the phosphor layer 42, recessed sections 42d occur on the bottom surface 42B of the phosphor layer 42 due to the air holes 42c. In the present embodiment, the wavelength conversion element 40 has the transparent member 45 formed on the bottom surface 42B of the phosphor layer 42.

As the material of the transparent member 45, there is used an inorganic material having a light transmissive property such as $SiO_2$. In the present embodiment, as described later, there is formed the transparent member 45 made of $SiO_2$ by calcining a polysilazane solution (a predetermined solution).

The transparent member 45 enters the recessed sections 42d of the bottom surface 42B to thereby seal the recessed sections 42d, and at the same time roughly planarizes the bottom surface 42B. Further, the transparent member 45 is disposed in the state of entering some of the air holes 42c. By the transparent member 45 entering the recessed sections 42d and some of the air holes 42c, it is possible to increase the mechanical strength of the phosphor layer 42.

The transparent member 45 also has a function as a stress relaxation layer for relaxing the stress caused by the heat generated in the phosphor layer 42. In the present embodiment, the thickness of the transparent member 45 is set equal to or smaller than a half of the thickness of the phosphor layer 42. By setting the thickness as described above, it is possible to exert the stress relaxation function described above in good condition.

In the present embodiment, as the material of the transparent member 45, there is used, for example, the same material ($SiO_2$) as that of the total reflection layer 50a of the reflecting member 43 described above. Thus, the adhesiveness between the transparent member 45 and the total reflection layer 50a (a first layer of the reflecting member 43) is improved.

The multilayer film 50 shown in FIG. 3 is a layer including an inorganic oxide, and includes the total reflection layer 50a for totally reflecting the light with an angle equal to or larger than the critical angle of the fluorescence YL generated in the phosphor layer 42, and reflection enhancement layers 50b, 50c and 50d. The reflection enhancement layers 50b, 50c and 50d are for exerting a reflection enhancement effect, and enhance the extraction efficiency of the fluorescence YL. The multilayer film 50 corresponds to a "first layer" described in the appended claims. The multilayer film 50 (the total reflection layer 50a) is disposed so as to have contact with, or to be stacked on the bottom surface 42B of the phosphor layer 42.

In the present embodiment, as the material of the total reflection layer 50a, there is used, for example, $SiO_2$. By using $SiO_2$, it is possible to totally reflect the fluorescence YL in good condition.

Further, $TiO_2$ is used as the material of the reflection enhancement layer 50b, $SiO_2$ is used as the material of the reflection enhancement layer 50c, and $Al_2O_3$ is used as the material of the reflection enhancement layer 50d.

In the present embodiment, as the material of the reflecting layer 52, there is used Ag with which high reflectivity is obtained. The reflecting layer 52 is disposed so as to be opposed to the bottom surface 42B of the phosphor layer 42, and reflects a part of the fluorescence YL, which is generated in the phosphor layer 42 and proceeds toward the base member 41, toward the plane of incidence of light 42A. Further, by the reflecting layer 52, the excitation light BLs which has entered the phosphor layer 42 and then entered the reflecting member 43 without being converted into the fluorescence YL is reflected and returned to the inside of the phosphor layer 42. Thus, it is possible to efficiently extract the fluorescence YL outside the phosphor layer 42.

It should be noted that it is also possible to dispose a protective layer for protecting the reflecting layer 52 between the base member 41 or the bonding material 55 and the reflecting layer 52. For example, the protective layer includes metal to enhance the durability of the reflecting layer 52 (an Ag film).

Further, it is also possible to arrange that a bonding assist layer for enhancing the reliability to the bonding between the reflecting member 43 and the base member 41 with the bonding material 55 is disposed between the base member 41 and the reflecting layer 52. For example, by using an Ag layer as the bonding assist layer, it is possible to improve the thermal conductivity between the reflecting member 43 and the base member 41. The bonding assist layer can also be arranged to be disposed between the reflecting layer 52 and the bonding material 55, or between the bonding material 55 and the base member 41.

As described above, the reflecting member 43 is configured by depositing the plurality of layers on the bottom surface 42B of the phosphor layer 42. Here, the case in which the flatness of the bottom surface 42B is low, for example, will be considered. In this case, it becomes difficult to deposit the layers constituting the reflecting member 43 in good condition. If the reflecting member 43 cannot be deposited to the bottom surface 42B in good condition, it is unachievable to reflect the fluorescence YL toward the plane of incidence of light 42A, and the extraction efficiency of the fluorescence YL deteriorates.

In contrast, in the wavelength conversion element 40 according to the present embodiment, the transparent member 45 which seals the recessed sections 42d to thereby obtain the roughly planarized surface is formed on the bottom surface 42B. Here, the roughly planarized surface denotes the flatness enough for forming the layers constituting the reflecting member 43 in good condition with the vapor deposition or the like, and the unevenness is allowed to the extent that the reflecting member 43 can be deposited.

The wavelength conversion element 40 according to the present embodiment is made to have uniform films (the multilayer film 50 and the reflecting layer 52) formed on the transparent member 45. In other words, in the wavelength conversion element 40 according to the present embodiment, the reflecting member 43 (the reflecting layer 52) is uniformly formed throughout the entire area on the bottom surface 42B.

The wavelength conversion element 40 according to the present embodiment is manufactured by, for example, a manufacturing method described below. FIG. 5A through FIG. 5D are diagrams showing a part of the manufacturing process of the wavelength conversion element 40.

Figure 5A:
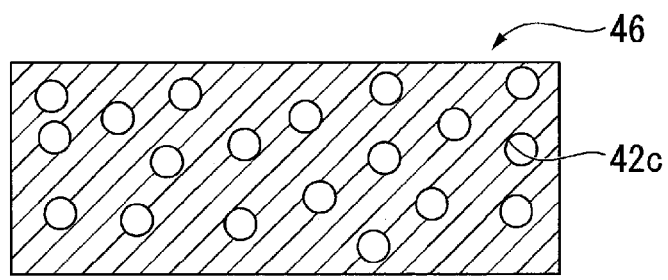
FIG. 5A is a diagram showing a manufacturing process of the wavelength conversion element.

Firstly, the mixture of the phosphor particles and an organic substance constituting the phosphor layer 42 is prepared, and then the mixture is calcined at a predetermined temperature. Due to the calcination, the organic substance evaporates, and as shown in FIG. 5A, there is formed a phosphor 46 including the plurality of air holes 42c. It should be noted that the size or the number of the air holes 42c can be controlled by the calcination temperature, the material of the organic substance and so on.

Figure 5B:
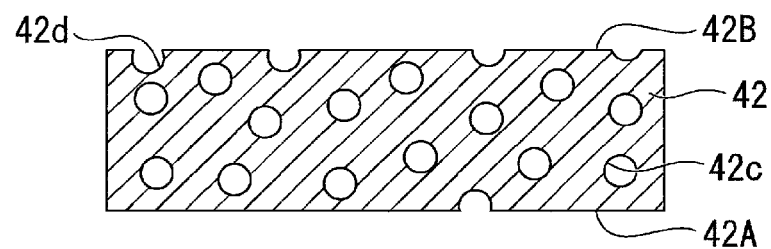
FIG. 5B is a diagram showing the manufacturing process of the wavelength conversion element.

Subsequently, as shown in FIG. 5B, the both surfaces of the phosphor 46 are ground to form the phosphor layer 42 having the plane of incidence of light 42A and the bottom surface 42B. Due to the grinding process, some of the air holes 42c are exposed to the outside, and thus, the recessed sections 42d are formed on the bottom surface 42B of the phosphor layer 42. Due to the process described above, the phosphor layer 42 having the plurality of air holes 42c is formed (a wavelength conversion layer formation process).

Figure 5C:
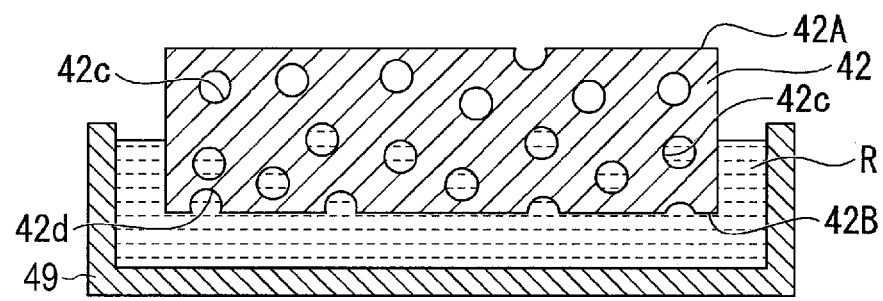
FIG. 5C is a diagram showing the manufacturing process of the wavelength conversion element.

Subsequently, the transparent member 45 is formed (a transparent member formation process) on the bottom surface 42B of the phosphor layer 42. As shown in FIG. 5C, the bottom surface 42B of the phosphor layer 42 is dipped in a polysilazane solution R retained in a container 49. In the case of assuming the thickness of the phosphor layer 42 as 50 μm, for example, the phosphor layer 42 is dipped so that the polysilazane solution R soaks into the phosphor layer 42 to the depth of about 5 μm from the bottom surface 42B. It should be noted that in the present embodiment, by dipping the phosphor layer 42 in the polysilazane solution R in the state in which a tape (not shown) is stuck to the side surface of the phosphor layer 42, and then separating the tape, the polysilazane solution R is attached only to the bottom surface 42B. It should be noted that a plane parallel to the side surface of the phosphor layer 42 is a plane crossing the plane of incidence of light 42A or the bottom surface 42B of the phosphor layer 42. Therefore, the side surface of the phosphor layer 42 crosses the plane of incidence of light 42A or the bottom surface 42B.

Thus, it is possible to make the polysilazane solution R enter (soak into) the inside of the recessed sections 42d formed on the bottom surface 42B in a good condition. For example, by providing a pressurized atmosphere after dipped in the polysilazane solution R in a vacuum atmosphere, it is possible to make the polysilazane solution R soak into the phosphor layer 42 in better condition.

It should be noted that it is desirable to make the polysilazane solution R soak into the phosphor layer 42 to the depth equal to or smaller than a half the thickness of the phosphor layer 42. This is because if the polysilazane solution R soaks too much, the number of the air holes 42c included in the phosphor layer 42 decreases to deteriorate the light scattering performance, and thus the extraction efficiency of the fluorescence YL deteriorates.

Since the inside of the phosphor layer 42 is in a porous state, the recessed sections 42d are communicated with the air holes 42c located inside the phosphor layer 42. Therefore, as shown in FIG. 5C, there is created the state in which the polysilazane solution R also enters some of the plurality of air holes 42c via the recessed sections 42d.

Figure 5D:
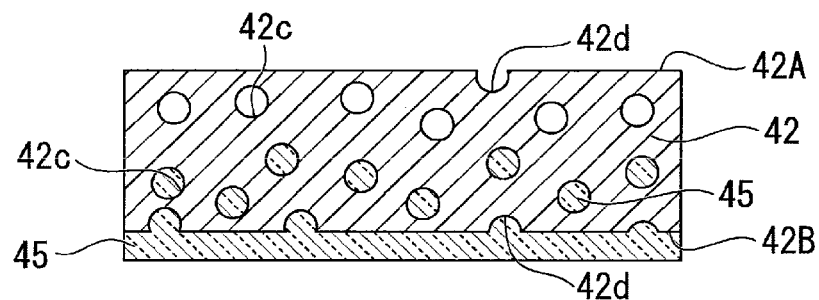
FIG. 5D is a diagram showing the manufacturing process of the wavelength conversion element.

Subsequently, the polysilazane solution R attaching to the bottom surface 42B is calcined. Thus, the polysilazane solution R cures to thereby form the transparent member 45 for sealing the recessed sections 42d on the bottom surface 42B as shown in FIG. 5D. Further, the polysilazane solution R having entered the air holes 42c cures to thereby create the state in which the transparent member 45 enters some of the air holes 42c as described above. It should be noted that the temperature when calcining the polysilazane solution R is lower than the temperature when calcining the mixture constituted by the phosphor particles and the organic substance.

In such a manner as described above, the transparent member 45 sealing the recessed sections 42d and having a roughly flat surface is formed on the bottom surface 42B of the phosphor layer 42.

Subsequently, by depositing the layers (the multilayer film 50 and the reflecting layer 52) in sequence on the transparent member 45 (at a position opposed to the bottom surface 42B) using a vapor deposition process, a sputtering process or the like, the reflecting member 43 is formed (a reflecting layer formation process).

In the present embodiment, the transparent member 45 is formed of the same material ($SiO_2$) as that of the total reflection layer 50a constituting the multilayer film 50. Therefore, the transparent member 45 and the multilayer film 50 (the total reflection layer 50a) are formed in the state of adhering to each other in good condition. It should be noted that since the surface of the transparent member 45 forms the roughly flat surface as described above, it is possible to uniformly deposit each of the multilayer film 50 and the reflecting layer 52.

Subsequently, the stacked body of the reflecting member 43, the transparent member 45 and the phosphor layer 42, and the base member 41 are fixed to each other via the bonding material 55. Lastly, by fixing the heat radiation member 44 to the surface on the opposite side to the phosphor layer 42 in the base member 41, the wavelength conversion element 40 is manufactured.

It should be noted that in the manufacturing method described above, it is also possible to form the stacked body of the reflecting member 43, the transparent member 45 and the phosphor layer 42 having a predetermined size by forming the transparent member 45 and the reflecting member 43 on a phosphor substrate large in size including a plurality of phosphor layers 42, and then segmentalizing the phosphor substrate by dicing.

As described hereinabove, according to the wavelength conversion element 40 of the present embodiment, since the recessed sections 42d of the phosphor layer 42 are filled with the transparent member 45 to planarize the surface, it is possible to improve the uniformity of the reflecting member 43 (the reflecting layer 52) formed on the transparent member 45.

Thus, the component having entered the bottom surface 42B out of the fluorescence YL generated by the phosphor layer 42 is reflected by the reflecting layer 52 of the reflecting member 43 in good condition, and is then emitted from the plane of incidence of light 42A. Therefore, it is possible to suppress the decrease in an amount of fluorescence emitted from the phosphor layer 42.

Here, as a comparative example, there will be described the case in which the transparent member 45 is not provided. In the case in which the transparent member 45 is not provided, the multilayer film 50 is not deposited on the bottom surface 42B in good condition due to the air holes 42c on the bottom surface 42B, and the multilayer film 50 becomes to have defects such as unevenness or openings.

Incidentally, there is a possibility that the aggregation of Ag atoms occurs in Ag as the material of the reflecting layer 52 due to the thermal migration caused by the heat generation when generating the fluorescence YL. If the transparent member 45 is not provided as stated above, the defect sections having occurred in the multilayer film 50 function as the aggregation pathway of the Ag atoms to decrease the reflectance of the reflecting layer 52.

In contrast, according to the wavelength conversion element 40 related to the present embodiment, the multilayer film 50 having a small number of defect sections can be formed on the surface which is planarized by disposing the transparent member 45. Therefore, since the number of the aggregation pathways of the Ag atoms (the defect sections of the multilayer film 50) can be decreased, as a result, it is possible to reduce the decrease in reflectance in the reflecting layer 52 due to the aggregation.

Further, since some of the air holes 42c inside the phosphor layer 42 are filled with the transparent member 45, it is possible to improve the thermal conductivity from the phosphor layer 42 to the reflecting member 43 side compared to the case in which the air intervenes in the air holes 42c.

Thus, since the heat generated in the phosphor layer 42 is transferred toward the base member 41 and the heat radiation member 44 via the reflecting member 43, the heat radiation performance of the phosphor layer 42 is improved. By improving the heat radiation performance of the phosphor layer 42 as described above, the heat radiation member 44 can be reduced in size, and therefore, it is possible to reduce the size of the wavelength conversion element 40 as a result.

Further, according to the wavelength conversion element 40 related to the present embodiment, by improving the heat radiation performance of the phosphor layer 42, the rise in temperature of the phosphor layer 42 can be reduced, and thus, it is possible to suppress the deterioration of the luminous efficiency of the phosphor layer 42. Therefore, according to the light source device 2A equipped with the wavelength conversion element 40, it is possible to reduce the loss of the fluorescence YL with respect to the amount of the excitation light entering the wavelength conversion element 40.

Further, according to the projector 1 related to the present embodiment, since the light source device 2A described above is provided, it is possible for the projector 1 to form a high-intensity image.

According to the method of manufacturing the wavelength conversion element 40 related to the present embodiment, it is possible to manufacture the wavelength conversion element 40 which suppresses the decrease in an amount of the light emitted from the phosphor layer 42 by filling the recessed sections 42d of the phosphor layer 42 with the transparent member 45 to thereby planarize the surface.

Second Embodiment

Then, a wavelength conversion element according to a second embodiment of the invention will be described. Members common to the embodiment described above will be denoted by the same reference symbols, and the detailed description thereof will be omitted.

Figure 6:
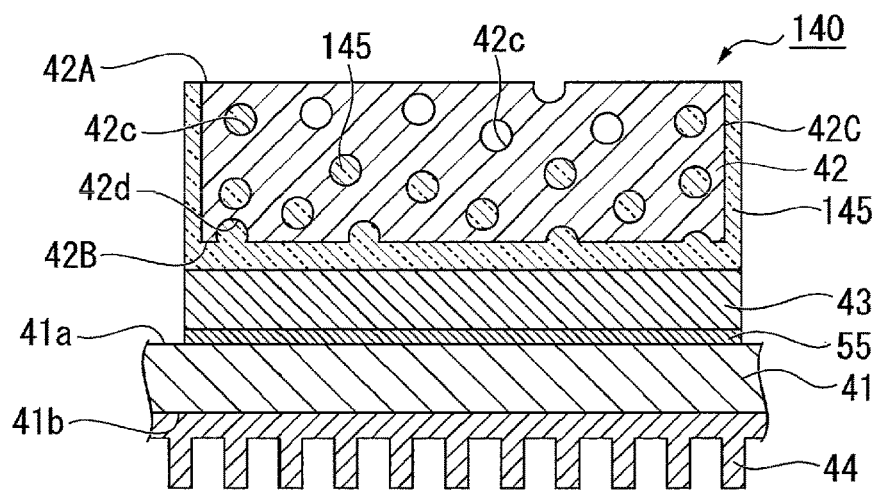
FIG. 6 is a cross-sectional view showing a configuration of an essential part of a wavelength conversion element according to a second embodiment of the invention.

FIG. 6 is a cross-sectional view showing a configuration of an essential part of a wavelength conversion element 140 according to the present embodiment.

As shown in FIG. 6, the wavelength conversion element 140 is provided with the base member 41, the reflecting member 43, a transparent member 145, the phosphor layer 42, and the heat radiation member 44.

In the side surface of the phosphor layer 42, there exist, for example, micro cracks (not shown) caused by dicing, and recessed sections (not shown) caused by the air holes 42c in some cases. Such micro cracks or the air holes can become starting points for damaging the phosphor layer 42.

In contrast, in the wavelength conversion element 140 according to the present embodiment, the transparent member 145 for planarizing the bottom surface 42B is disposed so as to cover a side surface 42C. According to the wavelength conversion element 140 related to the present embodiment, by covering the micro cracks and the air holes in the side surface 42C with the transparent member 145, there is obtained higher mechanical strength than in the configuration of the first embodiment in which the side surface 42C is not covered.

It should be noted that the side surface 42C of the phosphor layer 42 is a surface crossing the plane of incidence of light 42A or the bottom surface 42B.

Then, a method of manufacturing the wavelength conversion element 140 according to the present embodiment will be described.

Firstly, a mixture constituted by the phosphor particles and an organic substance is prepared, and then calcining the mixture at a predetermined temperature to thereby form (see FIG. 5A) the phosphor 46 including the plurality of air holes 42c.

In the present embodiment, by forming the phosphor large in size, and then segmentalizing the phosphor by dicing, the phosphor 46 is formed. The phosphor 46 formed by dicing becomes to have micro cracks due to the dicing formed in the side surface.

Subsequently, the both surfaces of the phosphor 46 are ground to form the phosphor layer 42 having the plane of incidence of light 42A and the bottom surface 42B (see FIG. 5B). Due to the grinding process, some of the air holes 42c are exposed to the outside, and thus, the recessed sections 42d are formed on the bottom surface 42B of the phosphor layer 42. Due to the process described above, the phosphor layer 42 having the plurality of air holes 42c is formed (the wavelength conversion layer formation process). It should be noted that the side surface 42C of the phosphor layer 42 has the micro cracks due to the dicing.

Subsequently, the phosphor layer 42 is dipped in the polysilazane solution R so that the side surface 42C and the bottom surface 42B are soaked in the solution. In the present embodiment, the whole of the phosphor layer 42 is dipped in the polysilazane solution R in the state in which the tape (not shown) is stuck to the plane of incidence of light 42A of the phosphor layer 42. Then, by pulling the phosphor layer 42 out from the polysilazane solution R and then separating the tape, it is possible to attach the polysilazane solution R only to the side surface 42C and the bottom surface 42B.

Thus, the polysilazane solution R soaks into the inside of the recessed sections 42d formed on the bottom surface 42B, the recessed sections formed in the vicinity of the side surface 42C, and the micro cracks occurring in the side surface 42C in good condition. For example, by providing a pressurized atmosphere after dipped in the polysilazane solution R in a vacuum atmosphere, it is possible to make the polysilazane solution R soak into the phosphor layer 42 in better condition.

Subsequently, the polysilazane solution R attaching to the bottom surface 42B and the side surface 42C is calcined. Thus, the polysilazane solution R cures to thereby form the transparent member 145 so as to cover the bottom surface 42B and the side surface 42C as shown in FIG. 6. In such a manner as described above, the transparent member 145 sealing the recessed sections 42d and having a surface formed of a roughly flat surface is formed on the bottom surface 42B of the phosphor layer 42.

Thereafter, similarly to the first embodiment, by depositing the multilayer film 50 and the reflecting layer 52 in sequence on the transparent member 145, the reflecting member 43 is formed (the reflecting layer formation process). Then, by fixing the base member 41 and the heat radiation member 44, the wavelength conversion element 140 is manufactured.

As described hereinabove, according to the wavelength conversion element 140 related to the present embodiment, since the transparent member 145 covers at least a part of the side surface 42C of the phosphor layer 42, it is possible to improve the strength of the phosphor layer 42 in addition to the advantages the wavelength conversion element 40 according to the first embodiment has. Therefore, the wavelength conversion element 140 reduces the damages and the cracks due to the stress of the phosphor layer 42 to thereby become excellent in reliability.

It should be noted that although the case in which the transparent member 145 covers a part of the side surface 42C of the phosphor layer 42 is cited as an example in the present embodiment, it is also possible for the transparent member 145 to cover the whole of the side surface 42C.

Third Embodiment

Then, a wavelength conversion element according to a third embodiment of the invention will be described. Members common to the first embodiment will be denoted by the same reference symbols, and the detailed description thereof will be omitted.

Figure 7:
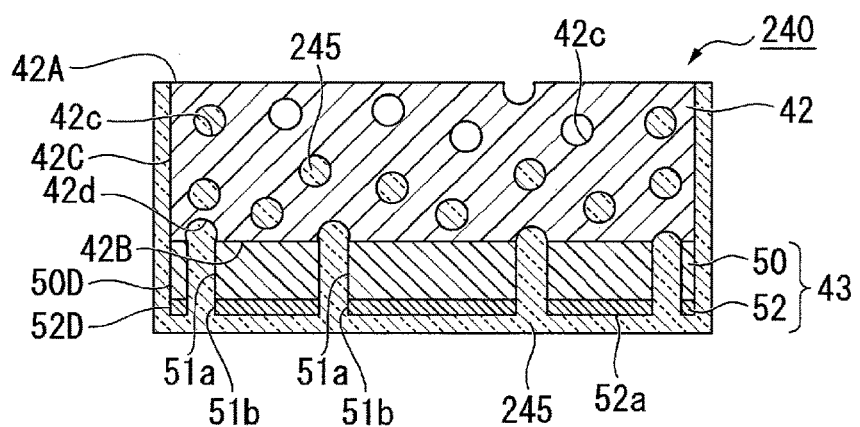
FIG. 7 is a cross-sectional view showing a configuration of an essential part of a wavelength conversion element according to a third embodiment of the invention.

FIG. 7 is a cross-sectional view showing a configuration of an essential part of a wavelength conversion element 240 according to the present embodiment. In FIG. 7, illustrations of the base member 41, the bonding material 55 and the heat radiation member 44 are omitted.

As shown in FIG. 7, in the wavelength conversion element 240 according to the present embodiment, the multilayer film 50 is directly formed on the bottom surface 42B of the phosphor layer 42. Therefore, since the multilayer film 50 is not deposited on the bottom surface 42B in good condition due to the air holes 42c, the multilayer film 50 has defects 51a. The defects 51a correspond to hole sections and unevenness caused by, for example, the deposition failure of the film.

Further, the reflecting layer 52 formed on the multilayer film 50 including the defects 51a has defects 51b similarly to the multilayer film 50.

In the present embodiment, a transparent member 245 is formed so as to cover a side surface 52D of the reflecting layer 52 and a side surface 50D of the multilayer film 50 from a lower surface 52a (a surface on the base member 41 side) of the reflecting layer 52, and at the same time cover the side surface 42C of the phosphor layer 42. It should be noted that in FIG. 7, in order to simplify the drawing, there is assumed the state in which the defects 51a, 51b are linearly communicated with each other.

It should be noted that the side surface 42C of the phosphor layer 42 crosses the plane of incidence of light 42A or the bottom surface 42B. Further, the side surface 52D of the reflecting layer 52 and the side surface 50D of the multilayer film 50 are cross-sectional surfaces along the film thickness direction of the reflecting layer 52 and the multilayer film 50, respectively.

Further, the transparent member 245 enters the recessed sections 42d of the phosphor layer 42 via the defects 51a, 51b to thereby seal the recessed sections 42d. Further, the transparent member 245 is disposed in the state of entering some of the air holes 42c.

Specifically, the transparent member 245 is disposed on the side surface 42C of the phosphor layer 42, and on the opposite side to the multilayer film 50 in the reflecting layer 52. The transparent member 245 covers the whole of the side surface 42C in the present embodiment, but can also have a configuration of covering a part of the side surface 42C.

Then, a method of manufacturing the wavelength conversion element 240 according to the present embodiment will be described.

Firstly, a mixture constituted by the phosphor particles and an organic substance is prepared, then calcining the mixture at a predetermined temperature to thereby form the phosphor 46 including the plurality of air holes 42c, and then the both surfaces are ground to form the phosphor layer 42 having the plurality of air holes 42c (see FIG. 5A and FIG. 5B). It should be noted that it is also possible to form the phosphor large in size, and then grind the both surfaces of the phosphor 46 segmentalized by dicing to thereby form the phosphor layer 42 similarly to the second embodiment described above.

Subsequently, by depositing the multilayer film 50 and the reflecting layer 52 in sequence on the bottom surface 42B of the phosphor layer 42, the reflecting member 43 is formed (a first layer formation process and the reflecting layer formation process).

In the present embodiment, since the multilayer film 50 and the reflecting layer 52 are directly formed on the bottom surface 42B of the phosphor layer 42, the multilayer film 50 and the reflecting layer 52 become to have the defects 51a, 51b as described above. The defects 51a of the multilayer film and the defects 51b of the reflecting layer 52 are communicated with each other in an area not shown. These defects 51a, 51b occur due to the recessed sections 42d on the bottom surface 42B of the phosphor layer 42, and are therefore communicated with the recessed sections 42d. Further, the recessed sections 42d are also communicated with the air holes 42c located inside the phosphor layer 42 in an area not shown.

Subsequently, the reflecting member 43 and the side surface 42C of the phosphor layer 42 are dipped in the polysilazane solution. On this occasion, the polysilazane solution enters the recessed sections 42d formed on the bottom surface 42B via the defects 51a, 51b, and at the same time also enters some of the air holes 42c via the recessed sections 42d. Further, the polysilazane solution attaches to the side surface (the side surface 52D of the reflecting layer 52 and the side surface 50D of the multilayer film 50) of the reflecting member 43. Further, the polysilazane solution soaks into the recessed sections and the micro cracks formed in the side surface 42C of the phosphor layer 42 in good condition. For example, by providing a pressurized atmosphere after dipped in the polysilazane solution in a vacuum atmosphere, it is possible to make the polysilazane solution soak into the phosphor layer 42 in better condition.

Subsequently, the polysilazane solution attaching to the lower surface 52a of the reflecting layer 52, the side surface (the side surface 52D of the reflecting layer 52 and the side surface 50D of the multilayer film 50) of the reflecting member 43, and the side surface 42C of the phosphor layer 42 is calcined. Thus, the polysilazane solution cures to thereby form the transparent member 245 extending from the lower surface 52a of the reflecting layer 52, passing through the side surface 52D of the reflecting layer 52 and the side surface 50D of the multilayer film 50, and then reaching the side surface 42C of the phosphor layer 42 as shown in FIG. 7. Further, the transparent member 245 is formed in the state of covering the whole of the side surface 42C of the phosphor layer 42. It should be noted that it is also possible to form the transparent member 245 so as to cover apart of the side surface 42C.

Lastly, by fixing the base member 41 and the heat radiation member 44, the wavelength conversion element 240 is manufactured similarly to the embodiments described above.

As described hereinabove, according to the wavelength conversion element 240 related to the present embodiment, the following advantages are obtained in addition to the advantages the wavelength conversion element 40 according to the first embodiment has.

As described above, there is a possibility that the aggregation of Ag atoms occurs in Ag as the material of the reflecting layer 52 due to the thermal migration caused by the heat generation when generating the fluorescence YL. In contrast, according to the wavelength conversion element 240 related to the present embodiment, since the defects 51a of the multilayer film 50 and the defects 51b of the reflecting layer 52 are plugged with the transparent member 245, these defects 51a, 51b no longer function as the aggregation pathways of the Ag atoms. Therefore, it is possible to prevent the deterioration of the reflectance of the reflecting layer 52 due to the aggregation from occurring.

Further, since the transparent member 245 covers the side surface 42C, it is possible to exert substantially the same advantages as those of the wavelength conversion element 140 according to the second embodiment. Further, the transparent member 245 enters the recessed sections 42d of the phosphor layer 42 via the defects 51a, 51b to thereby seal the recessed sections 42d. Further, the transparent member 245 enters some of the air holes 42c.

By the transparent member 245 entering the defects 51a, 51b, the recessed sections 42d and the air holes 42c, it is possible to increase the mechanical strength of the phosphor layer 42. Further, the transparent member 245 covers the side surface (the side surface 52D of the reflecting layer 52 and the side surface 50D of the multilayer film 50) of the reflecting member 43, and can therefore reduce the deterioration of the reflecting member 43 from the side surface. Thus, it is possible to improve the durability of the reflecting member 43.

Further, according to the method of manufacturing the wavelength conversion element 240 related to the present embodiment, the defects 51a, 51b are plugged with the transparent member 245. Thus, since the defects 51b having occurred in the reflecting layer 52 no longer function as the aggregation pathways, it is possible to manufacture the reflecting layer 52 in which the deterioration due to the aggregation is reduced. Therefore, it is possible to manufacture the wavelength conversion element 240 in which the decrease in the amount of the light emitted from the phosphor layer 42 is suppressed.

The invention is not limited to the contents of the embodiments described above, but can arbitrarily be modified within the scope or the spirit of the invention.

Figure 8:
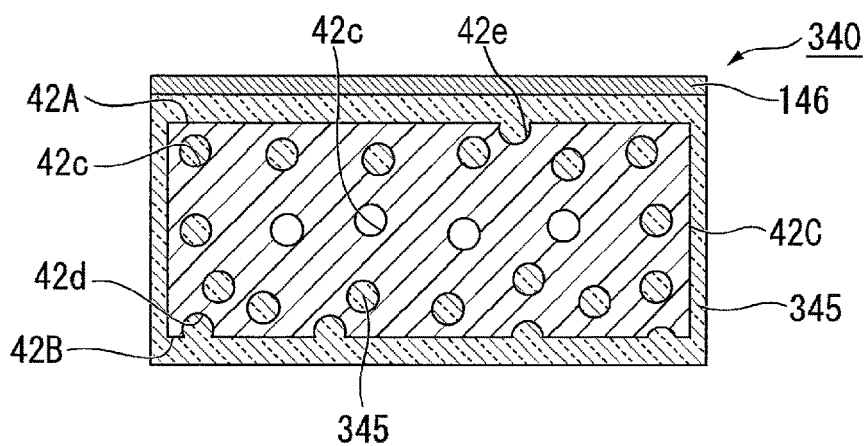
FIG. 8 is a diagram showing a configuration of a wavelength conversion element according to a modified example.

FIG. 8 is a diagram showing a configuration of a wavelength conversion element according to a modified example. FIG. 8 relates to the modified example of the second embodiment.

As shown in FIG. 8, in a wavelength conversion element 340 according to the present modified example, a transparent member 345 also covers the plane of incidence of light 42A of the phosphor layer 42. In the plane of incidence of light 42A, recessed sections 42e occur due to the air holes 42c similarly to the bottom surface 42B. The transparent member 345 enters the recessed sections 42e of the plane of incidence of light 42A to thereby seal the recessed sections 42e, and at the same time roughly planarizes the surface thereof. It should be noted that the transparent member 345 is made to be in the state of entering some of the air holes 42c.

Further, in the present modified example, an antireflection film 146 (an AR coat film) is disposed on the transparent member 345 which covers the plane of incidence of light 42A. According to the present modified example, there is provided the antireflection film 146 formed on a flat surface (the surface of the transparent member 345). Therefore, the antireflection film 146 becomes high in uniformity, and can therefore make the excitation light BLs efficiently enter the plane of incidence of light 42A.

Similarly, in the wavelength conversion element 240 according to the third embodiment, it is also possible that the transparent member 245 covers the plane of incidence of light 42A of the phosphor layer 42, and an antireflection film (an AR coat film) is disposed on the transparent member 245 which covers the plane of incidence of light 42A.

Further, although in the embodiments described above, there is described the example of installing the light source device according to the invention in the projector, this is not a limitation. The light source device according to the invention can also be applied to lighting equipment, a headlight of a vehicle, and so on.

The entire disclosure of Japanese Patent Application No. 2018-052135, filed on Mar. 20, 2018 is expressly incorporated by reference herein.

What is claimed is:

1. A wavelength conversion element comprising: a wavelength conversion layer having a plurality of air holes, and configured to be excited by light in a first wavelength band to thereby generate light in a second wavelength band different from the first wavelength band, the plurality of air holes being embedded in the wavelength conversion layer, with some of the plurality of air holes completely within the wavelength conversion layer; a transparent member adapted to seal a recessed section occurring on a first surface of the wavelength conversion layer due to the air hole; a reflecting layer disposed so as to be opposed to the first surface of the wavelength conversion layer; and a base member disposed so as to be opposed to the reflecting layer, wherein the transparent member is disposed in some of the plurality of air holes.

2. The wavelength conversion element according to claim 1, wherein
the transparent member is also disposed on at least a part of a side surface in the wavelength conversion layer.

3. The wavelength conversion element according to claim 1, further comprising:
a first layer disposed between the wavelength conversion layer and the reflecting layer,
wherein the transparent member is disposed on an opposite side to the first layer with respect to the reflecting layer.

4. The wavelength conversion element according to claim 2, further comprising:
a first layer disposed between the wavelength conversion layer and the reflecting layer,
wherein the transparent member is disposed on an opposite side to the first layer with respect to the reflecting layer.

5. The wavelength conversion element according to claim 3, wherein
the transparent member is disposed on a side surface of the first layer.

6. The wavelength conversion element according to claim 4, wherein
the transparent member is disposed on a side surface of the first layer.

7. A light source device comprising:
the wavelength conversion element according to claim 1; and
a light source adapted to emit the light in the first wavelength band toward the wavelength conversion element.

8. A light source device comprising:
the wavelength conversion element according to claim 2; and
a light source adapted to emit the light in the first wavelength band toward the wavelength conversion element.

9. A light source device comprising:
the wavelength conversion element according to claim 3; and
a light source adapted to emit the light in the first wavelength band toward the wavelength conversion element.

10. A light source device comprising:
the wavelength conversion element according to claim 5; and
a light source adapted to emit the light in the first wavelength band toward the wavelength conversion element.

11. A projector comprising:
the light source device according to claim 7;
a light modulation device adapted to modulate light from the light source device in accordance with image information to thereby form image light; and
a projection optical system adapted to project the image light.

12. A projector comprising:
the light source device according to claim 8;
a light modulation device adapted to modulate light from the light source device in accordance with image information to thereby form image light; and
a projection optical system adapted to project the image light.

13. A projector comprising:
the light source device according to claim 9;
a light modulation device adapted to modulate light from the light source device in accordance with image information to thereby form image light; and
a projection optical system adapted to project the image light.

14. A projector comprising:
the light source device according to claim 10;
a light modulation device adapted to modulate light from the light source device in accordance with image information to thereby form image light; and
a projection optical system adapted to project the image light.

15. A method of manufacturing a wavelength conversion element, the method comprising:
forming a wavelength conversion layer having a plurality of air holes;
forming a transparent member adapted to seal a recessed section generated due to the air holes by dipping at least a first surface having the recessed section out of the wavelength conversion layer in a predetermined solution, and then calcining the predetermined solution; and
forming a reflecting layer at a position opposed to the first surface of the wavelength conversion layer.

16. The method of manufacturing the wavelength conversion element according to claim 15, wherein
in the forming the transparent member, at least a part of a side surface crossing the first surface in the wavelength conversion layer is dipped in the predetermined solution.

17. A method of manufacturing a wavelength conversion element, the method comprising:
forming a wavelength conversion layer having a plurality of air holes and a recessed section generated due to the air holes;
forming a first layer at a position opposed to a first surface of the wavelength conversion layer;
forming a reflecting layer on an opposite side to the wavelength conversion layer of the first layer; and
forming a transparent member adapted to seal the recessed section by dipping the first layer and the reflecting layer in a predetermined solution after the forming the reflecting layer, and then calcining the predetermined solution.

* * * * *